United States Patent [19]

Halldorsson et al.

[11] Patent Number: 4,674,874
[45] Date of Patent: Jun. 23, 1987

[54] LASER DETECTION DEVICE

[75] Inventors: Thorsteinn Halldorsson, Munich; Sigmnund Manhart, Haar; Ernst A. Seiffarth, Taufkirchen, all of Fed. Rep. of Germany

[73] Assignee: Messerschmitt-Bölkow-Blohm GmbH, Fed. Rep. of Germany

[21] Appl. No.: 683,938

[22] Filed: Dec. 20, 1984

[30] Foreign Application Priority Data

Jul. 1, 1983 [DE] Fed. Rep. of Germany ....... 3323828

[51] Int. Cl.⁴ ............................................ G01B 11/26
[52] U.S. Cl. ..................................... 356/152; 250/227
[58] Field of Search ............... 356/141, 152; 343/375, 343/387; 250/227

[56] References Cited

U.S. PATENT DOCUMENTS

| 3,953,131 | 4/1976 | Britz | 356/152 |
| 4,099,879 | 7/1978 | Britz | 356/152 |
| 4,380,391 | 4/1983 | Buser et al. | 250/227 |
| 4,395,121 | 7/1983 | Nory et al. | 356/152 |
| 4,518,256 | 5/1985 | Schwartz | 356/5 |

Primary Examiner—Stephen C. Buczinski
Attorney, Agent, or Firm—McGlew and Tuttle

[57] ABSTRACT

A device for detecting the presence and direction of a pulsating or intensity-modulated laser radiation, in which the direction of radiation is exactly determined measures time intervals. A system with two detector elements is provided, with the first element producing a starting signal immediately when the laser radiation is incident, and the second element producing a stop signal which is delayed in time relative thereto. The second detector element is connected to a plurality of unequally long optical delay lines, each coupled to an optical collecting aperture having a specific orientation and a limited field of sight, with the individual fields of sight overlapping one another.

5 Claims, 4 Drawing Figures

360° Azimuth
60° Elevation
3°

Start- Stop

LASER DETECTION DEVICE

FIELD AND BACKGROUND OF THE INVENTION

The present invention relates in general to light detectors and in particular to a new and useful device for detecting the occurrence and direction of laser radiation.

Such devices, usually termed "laser warning sensor", are known and may or may not include directional detection. For example in an article by B. T. Ballard published in the periodical "Laser Focus", April '81, a laser warning system is described which may be called an interferometric warning sensor with direction analysis. It is further known, from German Pat. No. 28 30 308, to determine the direction of incidence of laser radiation, by means of various angular arrangements, from the different signal levels of the detectors.

German Pat. No. 29 31 818 discloses a device of the above mentioned kind comprising a ring arrangement through which the signal passes in opposite directions and the direction of incidence is determined from the time difference between the two passages. This device is not suitable for processing optical signals and the technology is very problematic. Also, it requires individual photodetectors for every direction of incidence.

All these prior art devices and methods have several drawbacks. Either their field of sight is limited and a panoramic monitoring can be ensured but at very high costs, or the angular resolution is too small, particularly at unfavorable directions of incidence. Frequently, even the shape of the laser signal is distorted by a time integration in the detector, which which makes it very difficult to recognize the impending threat. In some of the prior art devices, high sensitivity to disturbances or angular errors casued by partial soiling of the optical apertures produce adverse effects, or the adaptability to different laser wavelengths is restricted.

SUMMARY OF THE INVENTION

The present invention is directed to an elimination of those prior art drawbacks as far as possible, and to a device of the above-mentioned kind exhibiting high signal dynamics and permitting the analysis of signals and the reliable recognition of a laser threat.

Accordingly an object of the present invention is to provide a device for detecting the presence and direction of laser radiation from various plural directions which comprises a first laser detection means detecting laser radiation from any of the plural directions and for immediately generating a spark signal upon the incidence of the laser radiation, and second laser radiation detection means for detecting laser radiation from any of the plural directions and for generating a stop signal which is delayed by a selected amount from said start signal which depends on the direction from which the laser radiation came. The first and second detections may utilize separate laser detectors or the same laser detector. The delay is established by utilizing optic coupling elements or fibers of different length which extend from optic receivers for receiving laser radiation from the various plural directions, to the detector.

In future military conflicts, lasers will be employed to assist fire control systems. This increasing optical threat requires an effective warning system to detect the threat in time and take countermeasures. Since upon a laser beam emmission, bombardment is to be expected within a very short time, a detection without exactly detecting the direction is not sufficient for taking countermeasures. The inventive device ensures such an exact determination in the best possible way, as will be explained in the following description of embodiments shown in the accompanying drawings.

A further object of the invention is to provide a device for detecting the presence and direction of laser radiation which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 shows how a lens can be used with an optical fiber to produce overlapping fields of view.

DESCRIPTION OF THE PREFERRED EMBODIMENTS

Unlike in prior art directional selective laser sensors, the inventive device does not comprise any image-forming detectors and does not operate on the triangulation or signal level-comparing principle either, but determines the direction of incident laser radiation by measuring a time interval which is produced in the warning sensor itself by a signal delay depending on the direction of incidence.

Figures 1, 2:
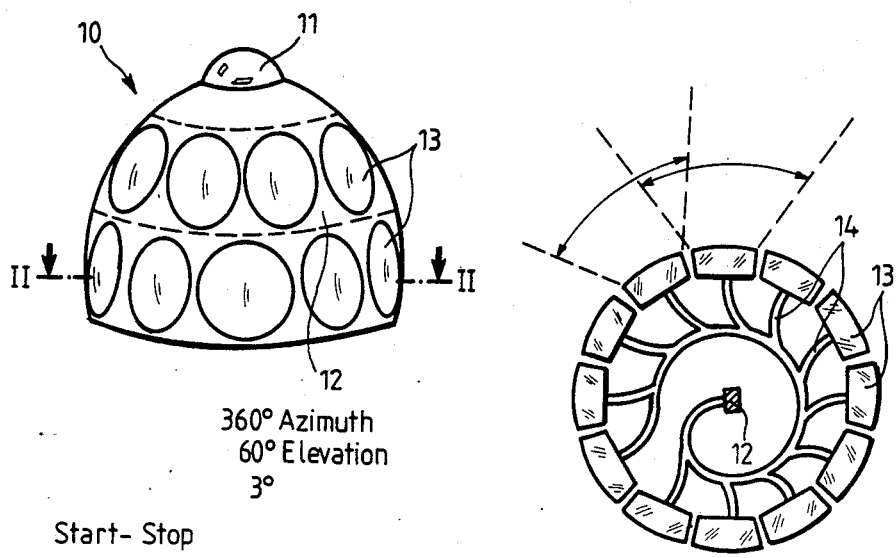
FIG. 1 is a diagrammatical perspective view of an inventive laser warning sensor.
FIG. 2 is a diagrammatical sectional view taken substantially along the line II—II of FIG. 1 and showing how the optical components are arranged.

In its simplest embodiment, the inventive warning sensor 10 comprises two detector elements, such as so-called single-chip semiconductor detectors, namely a sensor detector 11 shown in FIG. 1 which is capable of receiving a laser radiation from any direction and delivering a starting signal for the time interval measurement, and a directional detector 12 shown in FIG. 2, which is connected through a plurality of optical fibers 14 to various optical elements 13 of the same kind having each only a limited field of sight in a definite direction. Consequently, since the directional signal passes to detector 12 through optical fibers 14, a time delay is produced relative to the signal of sensor detector 11, which depends on the length of optical fibers 14, since the lengths of the individual optical fibers 14 leading to the individual optical elements 13 are not equal to each other. The time delay thus becomes a characteristic of the direction of the laser radiation, and this direction can be determined by measuring the time interval as already mentioned.

Figure 3:
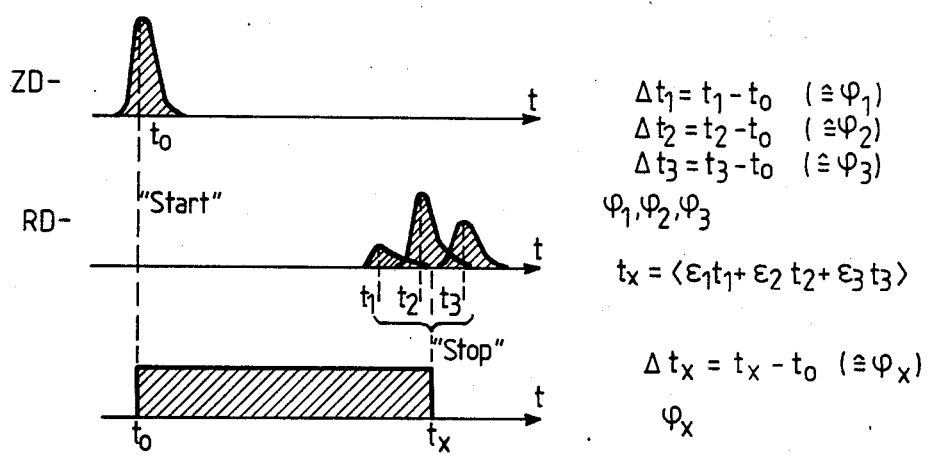
FIG. 3 is a time diagram explaining the angular interpolation by determining the weighted average and measuring the delay time.

To obtain a high angular resolution, it is further provided to overlap the fields of sight of the individual optical elements, as shown in FIG. 2. With such an arrangement, at least two but more as a rule, of unequally delayed signals arrive at the directional detector 12. An electronic evaluation in a conventional computer determines the weighted average value of the different directional signals as the time-significant stop signal. In this way, the discrete sight directions of the individual optical elements 13 can be interpolated and a considerably higher directional resolution is obtained. In the time diagram of FIG. 3, central detector signals (CD) and directional detector signals (DD) are compared with each other. Since the length of the delay lines ranges between 10 meters and some 100 meters, the direction is determined through the interval measurement very quickly, typically in one microsecond.

It is to be noted that since only individual detectors and no line or matrix detectors, are employed in the laser direction, the inventive device has some substantial advantages. First, the laser signal is produced by the electronic signal of the detector in an undistorted manner, so that the manner of the laser modulation can be determined in a simple way. Second, very high signal dynamics can be processed with the individual detectors, and third the spectral sensitivity of the conventional semiconductor detectors in the entire visible and infrared regions is very high. Of course, depending on the selected material of the optical fibers, optical elements, and material of the detectors, different spectal regions may be covered without departing from the measuring principle.

FIGS. 1 and 2 show one embodiment of an inventive sensor for panoramic 360° monitoring. Central starting detector 11, preferably designed as an immersed detector and capable of receiving signals from any direction, instantly starts the measuring of the time intervals. The second detector is designed as a stop detector 12. In this embodiment, it is assumed that detector 12 is connected through 36 optical fibers 14 of unequal lengths, to 36 light collectors 13 having their collecting faces located outside the respective focal planes in a manner so as to each cover a field of sight of about 25°. In this example, it is assumed that every next optical fiber 14 is longer by 5 meters than the preceding one, with the shortest fiber being 10 meter long and the longest one 185 meters. All the light delivering faces are bunched and connected to the sensitive face of the stop detector 12. If now, a laser pulse arrives exactly in the optical axis of one of the optical elements, a strong signal is delivered to stop detector 12 through the respective optical fiber delay line. However, since the fields of sight of adjacent optical elements overlap, and due to the unequal delays by the optical fibers, a weaker leading signal and a weaker trailing signal, symmetrical in time relative to the basic signal, also arrive at detector 12. The average delay time of the two symmetrical signals coincides with that of the basic signal, so that in the interval measuring circuit (not shown) a delay time is measured exactly corresponding to the actual direction of incidence in the optical axis of the corresponding optical element.

If the direction of incidence does not coincide with the optical axis of one of the receiving elements, the basic signal is proportionally weaker, and the leading and trailing signals from the adjacent elements are proportionally stronger. The measurement of the weighted average then is an interpolation between the individual optical axes. In the present example, the optical axes of adjacent optical elements form angles of 10°. The delay time therebetween is $t = l \cdot n/c$, with l being the difference in length between adjacent optical fibers, n being the index of refraction, and c being the speed of light. For $l = 5$ m, $n = 1.5$ and $c = 300,00$ km/s, $t = 25$ ns. To obtain an angular resolution of 1°, the average delay time of the stop signal must be determined with an accuracy of 2.5 ns, which is easy to obtain with conventional electronic means. The maximum delay time of the signal in the optical part of the warning sensor is $t = 1$ microsecond, so that the reactive capability of the entire system is not unfavorably affected. The dimensions provided in the example are: diameter of the individual optical elements 14 mm, diameter of warning sensor 180 mm.

The warning sensor 10 is designed for an azimuthal range of 360°, however, without a resolution in elevation. This resolution in elevation is obtained by providing collecting apertures on a hemisphere or a hemispheral segment. It is also possible, however, to superimpose a plurality of inventive devices one above the other, with conical fields of sight individually differing from each other.

To increase the safety against disturbances of laser warning sensor 10, one or more narrow-band optical filters matched to the expected radiation may be provided in front of the detectors, to suppress the interfering and background radiation, for example. An electronic filtering of the signal also would raise no problems. Since the threatening laser radiations are predominantly short individual pulses or pulse modulated signals, other interfering radiating sources may easily be suppressed by means of high-pass filters.

Figure 4:
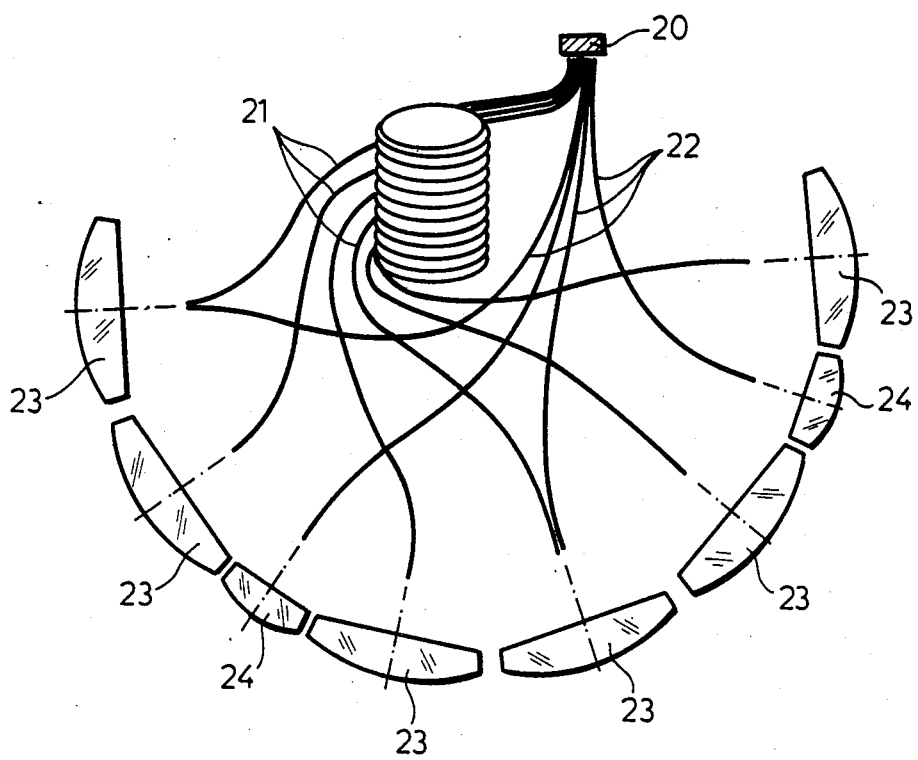
FIG. 4 shows diagrammatically the arrangement in another embodiment of the invention.

FIG. 4 shows another embodiment in which the starting signal and the stop signal are produced by a single detector to reduce the number of detector elements. In such an embodiment, the laser signal coming from the field of sight to be monitored must pass from the optical elements 23, 24 to the detector element 20 through one or more optical coupling elements 22, preferably optical fibers, which are as short as possible. The signal which is delayed by coupling elements 22 by always the same time interval, irrespective of the angle of incidence, forms the starting signal. Simultaneously, the long-delay members 21, preferably also optical fibers, are coupled to the same detector 20. The laser signal directed through delay members 21 produces the stop signal. By correctly combining the optical delay members 21 having unequal lengths, depending on the angle of incidence, with optical coupling members 22 having mutually equal, minimum time delays, the difference of the signal delay through delay elements 21 and through coupling elements 22 is made satisfactorily large, so that no time overlapping of the signals occurs.

FIG. 5 shows how lens 13 can have its focal point or plane offset inwardly of the signal collecting face of optical fiber 14 to cause overlapping of the field of sight of adjacent lens 13.

While specific embodiments of the invention have been shown and described in detail to illustrate the application of the principles of the invention, it will be understood that the invention may be embodied otherwise without departing from such principles.

What is claimed is:

1. A device for detecting presence and direction of laser radiation, comprising:
   first laser radiation detection means for detecting laser radiation from any of a plurality of directions and for generating a start signal immediately upon incidence of the laser radiation; and second laser radiation detection means for detecting laser radiation from any of said plurality of directions and for generating a stop signal which is delayed by a separate selected amount depending on from which one of the plurality of directions the laser radiation came;

said second laser radiation detection means comprising a plurality of optical elements distributed to receive laser radiation from the plurality of directions, a detector element for detecting the occurrence of laser radiation and an optical coupling element connected between each of said plurality of optical elements and said detector elements, each optical coupling element having a difference effective length for establishing a different transit time for light from each optical element to said detector element, said optical elements each having overlapping directions of incidence for causing a plurality of stop signals to be generated each from adjoining directions.

2. A device according to claim 1, wherein said first laser radiation detection means comprises a separate detector element from said first mentioned detector element for receiving laser radiation from all of said plurality of directions.

3. A device according to claim 1, wherein said first laser radiation detection means comprises said detector element of said second laser radiation detector means and a plurality of separate coupling elements each connected between one of said optical elements and said detector elements, each of said separate optical coupling elements having the same effective length for the same light transmitting time, said light transmitting time being less than the light transmitting time of any of said first mentioned plurality of optical coupling elements.

4. A device according to claim 1, wherein said plurality of directions extend around an azimuth of 360°, said optical elements, being distributed around the azimuth of 360°.

5. A device according to claim 4, wherein each of said optical coupling elements comprises an optical fiber having a different length.

* * * * *